United States Patent
Smith et al.

(10) Patent No.: US 10,037,544 B2
(45) Date of Patent: Jul. 31, 2018

(54) TECHNOLOGIES FOR COLLECTING ADVERTISING STATISTICS IN A PRIVACY SENSITIVE MANNER

(71) Applicant: INTEL CORPORATION, Santa Clara, CA (US)

(72) Inventors: Ned M. Smith, Beaverton, OR (US); Nathan Heldt Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 808 days.

(21) Appl. No.: 14/360,118

(22) PCT Filed: Dec. 18, 2013

(86) PCT No.: PCT/US2013/076237
§ 371 (c)(1),
(2) Date: May 22, 2014

(87) PCT Pub. No.: WO2015/094245
PCT Pub. Date: Jun. 25, 2015

(65) Prior Publication Data
US 2015/0170197 A1    Jun. 18, 2015

(51) Int. Cl.
*G06Q 30/02* (2012.01)
*H04L 9/00* (2006.01)

(52) U.S. Cl.
CPC ......... *G06Q 30/0242* (2013.01); *H04L 9/008* (2013.01); *G06Q 2220/00* (2013.01); *H04L 2209/46* (2013.01)

(58) Field of Classification Search
CPC ..................................................... G06Q 30/02
See application file for complete search history.

(56) References Cited

U.S. PATENT DOCUMENTS 7,194,424 B2    3/2007    Greer et al.
7,680,855 B2 *  3/2010    Hyder ................... G06Q 10/10
                                                  707/710
(Continued)

FOREIGN PATENT DOCUMENTS

JP    2006-113851 A       4/2006
KR    10-2000-0063868 A   11/2000
(Continued)

OTHER PUBLICATIONS

Mash Maker—A Paradigm Shift in Web Browsing, 23 Pages.
(Continued)

*Primary Examiner* — Vincent M Cao
(74) *Attorney, Agent, or Firm* — Grossman, Tucker, Perreault & Pfleger, PLLC

(57) ABSTRACT

Generally, this disclosure provides technologies for collecting ad statistics in a privacy sensitive manner. In some embodiments the technology includes a system which includes a plurality of client devices, each hosting a context information management (CIMM) module in a secure processing environment. Each CIMM may be operable to select ads for display and calculate statistics for each of the selected ads. The CIMMs may generate a vector representative of those statistics, and may encrypt that vector using additive homomorphic encryption. The encrypted vector may be associated with a statistics collection counter, which may be incremented each time an encrypted vector is calculated. Each CIMM may compare the incremented counter value to a threshold, and may distribute the encrypted vector to another CIMM for further statistical tabulation if the incremented value is less than the threshold. In this way, the technologies described may ensure that a minimum statistical sample size is collected prior to the (Continued)

transmission of ad statistics to an ad network or advertiser, potentially maintaining or protecting user privacy.

24 Claims, 3 Drawing Sheets

(56) References Cited

U.S. PATENT DOCUMENTS

| | | | |
|---|---|---|---|
| 7,689,672 | B2 | 3/2010 | Kanojia et al. |
| 8,396,746 | B1 | 3/2013 | Wang |
| 9,111,100 | B2 | 8/2015 | Smith et al. |
| 9,282,048 | B1* | 3/2016 | Fichter .................... H04L 47/25 |
| 2003/0074330 | A1 | 4/2003 | Asokan et al. |
| 2004/0254857 | A1* | 12/2004 | Onizuka ................ G06Q 30/02 705/26.1 |
| 2006/0030990 | A1* | 2/2006 | Anderson ............. G06Q 10/00 701/50 |
| 2008/0028066 | A1 | 1/2008 | Berkhin et al. |
| 2008/0065491 | A1* | 3/2008 | Bakman ................ G06Q 30/02 705/14.41 |
| 2008/0162693 | A1 | 7/2008 | Kanojia et al. |
| 2008/0222283 | A1 | 9/2008 | Ertugrul et al. |
| 2009/0030780 | A1* | 1/2009 | York ...................... G06Q 30/02 705/14.41 |
| 2010/0174671 | A1* | 7/2010 | Brooks .................. G06Q 10/04 706/12 |
| 2010/0235496 | A1* | 9/2010 | Zhao ..................... H04L 41/142 709/224 |
| 2011/0060918 | A1* | 3/2011 | Troncoso Pastoriza ................ G06F 21/72 713/189 |
| 2011/0173065 | A1* | 7/2011 | Lester ................... G06Q 30/02 705/14.45 |
| 2011/0264920 | A1* | 10/2011 | Rieffel .................... H04L 9/008 713/189 |
| 2012/0130802 | A1* | 5/2012 | Shimizu ............. G06Q 30/0245 705/14.44 |
| 2012/0158516 | A1 | 6/2012 | Wooten et al. |
| 2012/0239504 | A1 | 9/2012 | Curlander et al. |
| 2013/0097417 | A1 | 4/2013 | Lauter et al. |
| 2014/0108805 | A1* | 4/2014 | Smith .................... G06F 21/64 713/171 |
| 2014/0180816 | A1 | 6/2014 | Mith et al. |
| 2014/0283099 | A1 | 9/2014 | Smith et al. |
| 2014/0316886 | A1 | 10/2014 | Smith et al. |
| 2015/0096043 | A1 | 4/2015 | Smith et al. |

FOREIGN PATENT DOCUMENTS

| | | |
|---|---|---|
| KR | 10-2010-0067816 A | 6/2010 |
| WO | 2014-098876 A1 | 6/2014 |
| WO | 2014-142864 A1 | 9/2014 |
| WO | 2015-047287 A1 | 4/2015 |

OTHER PUBLICATIONS

Krawczyk, Hugo, "SIGMA: the 'SIGn-and-MAc' Approach to Authenticated Diffie-Hellman and its Use in the IKE Protocols", Advances in Cryptology—CRYPTO 2003, 23rd Annual International Cryptology Conference, Aug. 17-21, 2003, vol. 2729, 26 pages.

International Search Report and Written Opinion received for PCT Patent Application No. PCT/US2012/071029, dated Sep. 27, 2013, 11 pages.

Smith, et al. "Prioritizing Facts for On-Line Trust Negotiation", International Conference on Security and Management, Jun. 23-26, 2003, vols. 1 and 2, 7 pages.

Toubiana et al., "Adnostic: Privacy Preserving Targeted Advertising", NDSS Symposium, Mar. 1, 2010, 16 Pages, available at: <http://www.internetsociety.org/doc/adnostic-privacy-preserving-targeted-advertising>.

International Preliminary Report on Patentability and Written Opinion issued in PCT Application No. PCT/US2013/076237, dated Jun. 30, 2016, 6 pages.

International Search Report and Written Opinion issued in PCT Application No. PCT/US2013/076237, dated Sep. 17, 2014, 7 pages.

* cited by examiner

TECHNOLOGIES FOR COLLECTING ADVERTISING STATISTICS IN A PRIVACY SENSITIVE MANNER

FIELD

The present disclosure relates to technologies for collecting advertising statistics and, more particularly, to technologies for collecting advertising statistics in a privacy sensitive manner.

BACKGROUND

The background description provided herein is for the purpose of presenting the context of the present disclosure. Work of the inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure, and are not admitted to be prior art by inclusion in this section.

Online advertising is a multibillion dollar business, and is growing as use of the internet becomes more pervasive. With this in mind, there are four primary players in the online advertising ecosystem, namely an advertiser, an ad-network, a publisher, and an end user. Generally, an advertiser is a party that has an advertisement (or "ad") that it wishes to distribute to end users. The advertiser is typically willing to pay a third party, e.g., the ad-publisher, to publish its ads. An ad-network may act as an intermediary between advertisers and publishers. For example, an ad-network may collect a plurality of ads from advertisers and place them in publication space, e.g., via ad space on web-sites, computer programs, or other utilities that the end user may use.

The general relationship of these parties is illustrated in FIG. 1. As shown, advertising ecosystem 100 includes advertiser 100, which provides ads to ad network 102. Ad network 102 transmits certain ads to publisher 103, which publishes them in ad space (not shown) which may be viewed by user 104. Publisher 103 may be paid by one or both of ad network 102 and advertiser 101 or both for its publication services. Ad network 102 may track ads published by publisher 103 and provide billing services for advertiser 101.

To create value for advertisers, ad-networks may also perform user tracking, which may aim to associate user behavior with respect to published ads. The goal of user tracking may be, for example, to associate user behavior with the user's identity and/or characteristics of the user, e.g., his or her interests, preferences, spending habits, etc. By way of example, ad network may collect ad delivery statistics from publisher 103 to determine which ads were published, which ads were interacted with by user 104 (e.g., clicked), which ads were ignored by user 104, etc. By manipulating these statistics, ad network 102 may be able to determine user 104's interests and/or identity, something user 104 may wish to protect. This issue is of particular in low-distribution ad-campaigns, where an individual or a small group is targeted with an ad that is specific to a particular interest or topic.

Online advertising ecosystems such as the one shown in FIG. 1 can therefore raise privacy concerns for users. Although technologies have been developed to address some of these concerns, they may require users to trust a third party (e.g., a trusted third party) with their privacy sensitive information. If the trusted third party is compromised or is in fact not trustworthy, unwanted distribution of user privacy sensitive information may result.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

The present disclosure generally relates to technologies, including devices, systems, methods, and computer readable media for collecting advertising statistics in a privacy sensitive manner. In general, the technologies described herein utilize a context information management module (CIMM) that is executed within a secure processing environment of a client device to perform ad statistics collection and reporting functions using additive homomorphic encryption (AHE). A statistics collection counter (SCC) is maintained for each ad statistic gathered by the CIMM, and a threshold statistics collection value (TSCV) is maintained within the secure processing environment.

As will be described below, the TSCV value may be set so as to define a minimum size for an ad distribution campaign, e.g., a size that may make it practically difficult for an ad network and/or an advertiser to deduce information about specific end users. In this regard, the CIMM may increment the value of the statistics collection counter each time an ad statistic is collected and compare the resulting incremented SCC value to the threshold statistics collection value. Based on that comparison the CIMM may forward encrypted ad statistics to another client device for further statistics gathering (e.g., to increase the "sample size" of the collected ad statistics), or it may report the encrypted ad statistics to an ad network and/or an advertiser.

As may be appreciated, the technologies of the present disclosure eliminate the need to use a trusted third party to perform anonymous reporting of ad statistics. As a result, the technologies described herein may eliminate some or all of the privacy concerns associated with the use of such parties.

Figure 1:
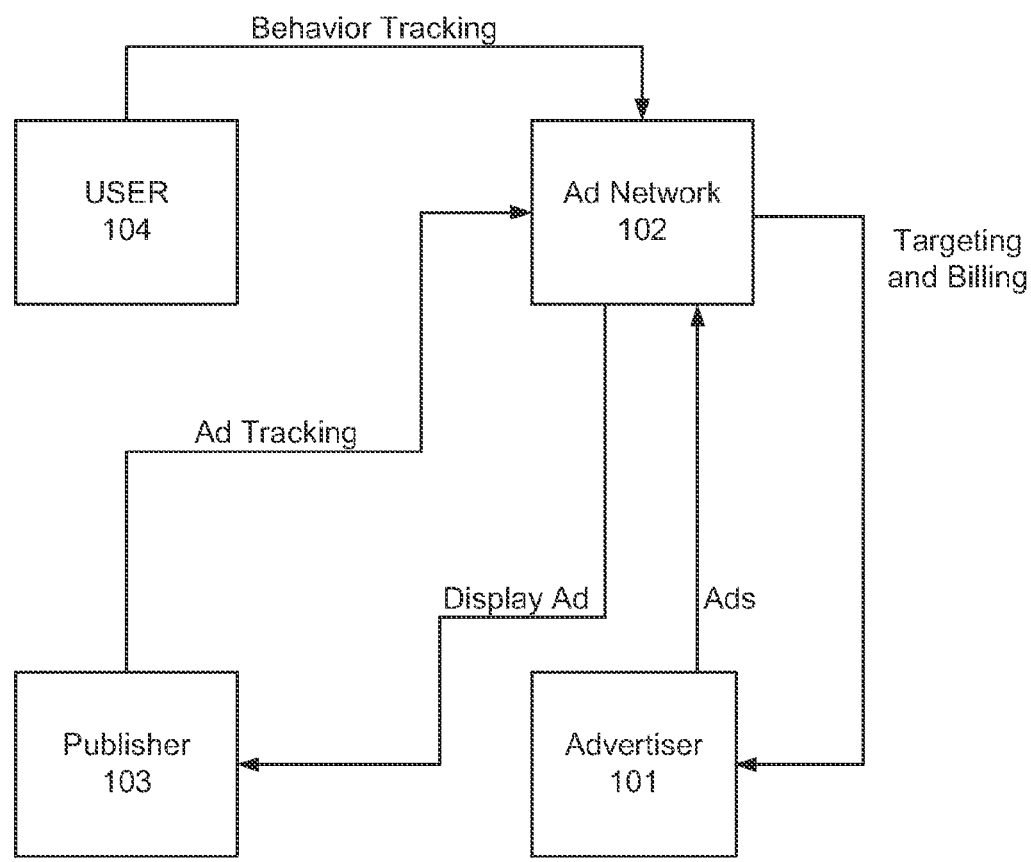
FIG. 1 is a high level diagram of an online advertising ecosystem consistent with the prior art.
Figure 2:
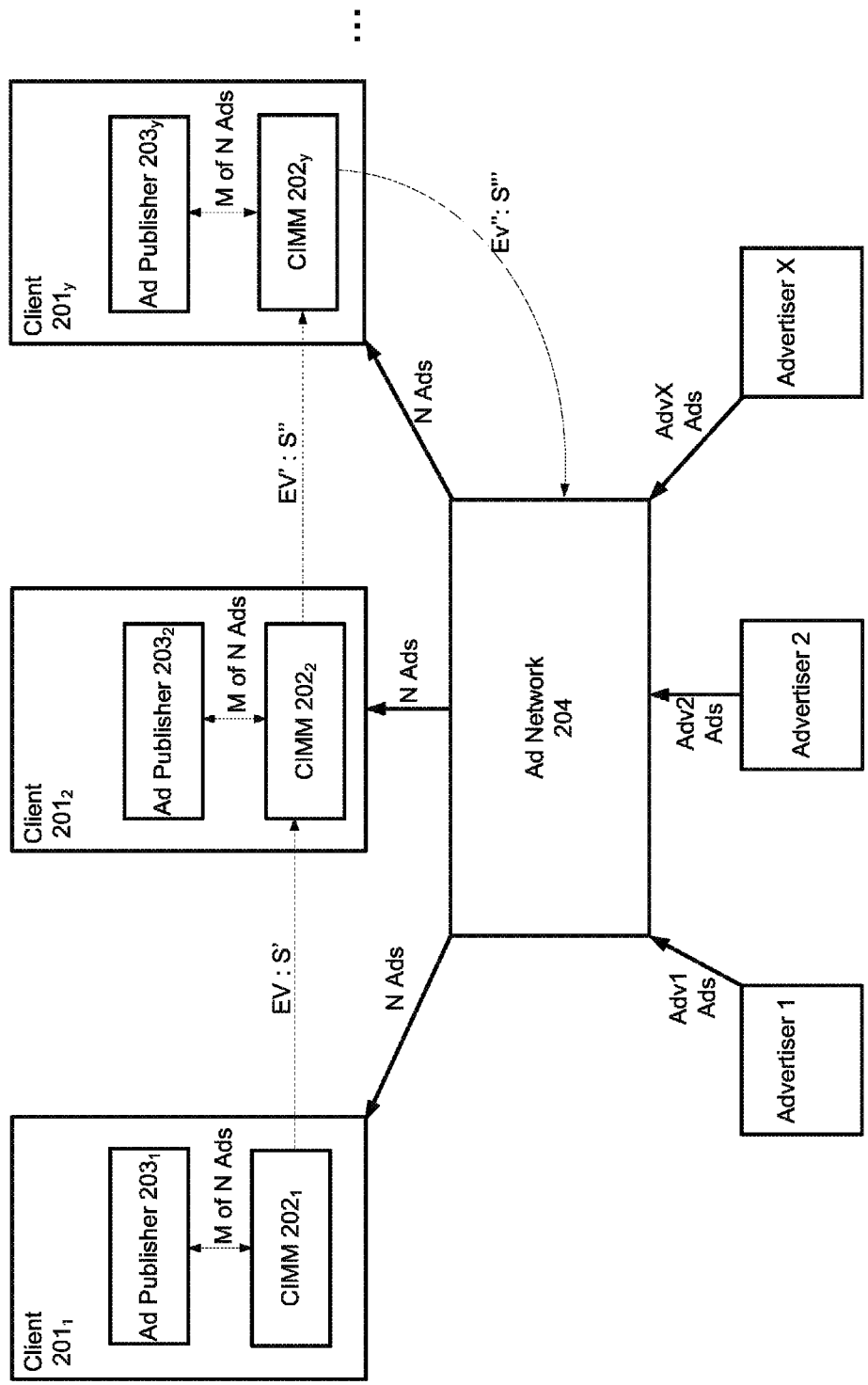
FIG. 2 is a block diagram of an advertising and statistics collection system consistent with the present disclosure.

Reference is now made to FIG. 2, which illustrates an exemplary advertising and statistics collection system consistent with the present disclosure. As shown, system 200 includes a plurality of client devices, such as client $201_1$, client $201_2$ ... client $201_y$, etc., wherein y is 0 or an integer value greater than or equal to 3. System 200 further includes ad network 204 and a plurality of advertisers, such as advertiser 1, advertiser 2, advertiser X, etc.

In general, ad network 204 may receive a plurality of ads from advertisers, such as advertiser 1, advertiser 2, advertiser X (where X is an integer greater than or equal to 3), etc. This concept is illustrated in FIG. 2, which shows the distribution of advertiser 1's ads (Adv1 Ads), advertiser 2's ads (Asv2 Ads), and advertiser X's ads (AdvX Ads) to ad network 204. In some instances, ads received by ad network 204 may be targeted to specific users, e.g., based on one or more "dimensions" relevant to a user or group of users. In various embodiments, a "dimension" may include or correlate to one or more attributes of a user or group of users, attributes of a computing environment used by the user or group of users, a population count of users or computing environments sharing the attribute.

By way of example, an attribute of a computing environment associated with a user may include an attribute of a computing device associated with the user (e.g., operated by and/or owned by the user or someone with whom the user has a relationship), an attribute of a virtual machine provided for use by the user or someone with whom the user has a relationship, attributes of software executed on a computing device associated with a user, context data (temperature, velocity, location, etc.) sensed by a computing device associated with a user, combinations thereof, and the like.

Ad network 204 may deliver all or a subset of the ads it receives to one or more clients. This concept is illustrated in FIG. 2, which depicts ad network 204 as delivering N ads to clients $201_1$, $201_2$, $201_y$, etc., where N is a value corresponding to the number and/or identity of distinct ads transmitted to a client. For simplicity and ease of understanding, advertiser 204 is illustrated as transmitting N ads to each of clients $201_1$, $201_2$, $201_y$, implying that the same ads are delivered to each client. It should be understood that this illustration is exemplary, and ad network 204 may deliver different ads and/or a different number of ads to all or a subset of the clients in system 200.

Client devices $201_1$, $201_2$, $201_k$ may each be an electronic device that is suitable for receiving ads, publishing ads for user consumption, and performing ad statistics collection operations consistent with the present disclosure. Client devices $201_1$, $201_2$, and/or $201_x$ may therefore be selected from any of a wide variety of mobile or other electronic devices, such as but not limited to cellular phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, ultra-mobile personal computers, wired telephones, combinations thereof, and the like. Without limitation, client devices $201_1$, $201_2$, $201_y$, etc. preferably are at least one of a cellular phone, desktop computer, electronic reader, notebook computer, smart phone, tablet personal computer, or a combination thereof. It should be understood that client devices $201_1$, $201_2$, $201_y$ need not be the same type of device.

For the sake of illustration and ease of understanding, FIG. 2 illustrates a system in which three client devices are employed. It should be understood that this illustration is exemplary only, and that any suitable number of client devices may be used. Accordingly, the present disclosure envisions systems in which one, two, or more client devices are used. Accordingly in system 200, y may in some embodiments equals 0 or may be an integer ranging from greater than or equal to 3, such as greater than or equal to 10, 20, 50, 100, 1000, 10,000, as well as values above, below and there between, and ranges defined by such values. In some embodiments, y is greater than or equal to a threshold statistics collection value (TSCV) that may be set for the collection of ad statistics, as will be described later.

The client devices described herein may each include one or more processors, memory and secure processing environments, which for the sake of simplicity and clarity are not illustrated in FIG. 2. Any suitable processor may be used, including application specific integrated circuits (ASIC) and general purpose processors such as single and multicore processors, which may be capable of executing one or multiple threads. Non-limiting examples of suitable processors that may be used in clients $201_1$, $201_2$, $201_y$ include the mobile and desktop processors available from INTEL®, Advanced Micro Devices (AMD®), APPLE®, SAMSUNG®, and NVIDIA®. Without limitation, the processors used in the client devices described herein are preferably in the form of an INTEL® mobile or desktop processor. It should be understood that the type and capabilities of the processor used in the clients participating in system 200 need not be the same.

Non-limiting examples of suitable memory types that may be used in the clients described herein include semiconductor firmware memory, programmable memory, non-volatile memory, read only memory, electrically programmable memory, random access memory, flash memory (which may include, for example, negated and (NAND) or negated or (NOR) type memory structures), magnetic disk memory, optical disk memory, processor memory (cache), other or later developed memory types, combinations thereof, and the like.

As noted previously, clients $201_1$, $201_2$, $201_y$, etc. may include one or more secure processing environments, which as will be described later may be used during the performance of ad collection and processing functions consistent with the present disclosure. As used herein, the term "secure processing environment" refers to an execution environment within a client device, wherein the execution environment includes memory and processing resources that are isolated or otherwise protected from other components of the client via hardware, firmware, software or a combination thereof.

One example of a secure processing environment that may be used in the client devices of the present disclosure is a trusted execution environment (TEE). Generally, a TEE is a protected environment that may run alongside an operating system and which can provide secure services to that operating system. More information regarding TEEs and the implementation thereof may be found in the TEE client application programming interface (API) specification v1.0, the TEE internal API (application programming interface) specification v1.0, and the TEE system architecture v1.0 issued by GlobalPlatform.

In some embodiments the client devices described herein include a TEE that was provided using one or more of virtualization technology, uCode enhanced memory page protection, CPU cache as memory page protection, security co-processor technology, and combinations thereof. Non-limiting examples of such technology include INTEL® VT-x virtualization technology, INTEL® VT-d virtualization technology, INTEL® trusted execution technology (TXT), Xeon internet security and acceleration (ISA) "cache as random access memory (RAM)", converged security engine (CSE) technology, converged security and manageability engine (CSME) technology, a security co-processor, manageability engine, trusted platform module, platform trust technology, ARM TRUSTZONE® technology, combinations thereof, and the like. The nature, advantages and limitations of each of these technologies are well understood and are therefore not described herein.

Memory enclave technology is another example of a secure processing environment that may be used in the client devices described herein. Generally, a memory enclave may be made up of at least one memory page that has a different access policy than the access policy imposed by traditional ring boundaries of a computing system (in this case, a client device). The memory page(s) within a memory enclave may have associated read/write controls, which may be configured such that the read/write controls have exclusivity over certain operating modes or privilege "rings", such as system management mode or virtual machine monitors of an associated processor. Information stored and operations conducted within a memory enclave of a client device may therefore be isolated from other information, operations, and components of the client device. One example of suitable memory enclave technology is Intel® Secure Enclave technology.

The secure processing environments of the present disclosure may be configured to store encrypted and unencrypted ad statistics, either alone or in conjunction with other information. Therefore in addition to ad statistics, a secure processing environment may store one or more keys that may be used to encrypt, decrypt, or sign ad data. For example, a secure processing environment consistent with the present disclosure may store a public additive homomorphic encryption key (PAHEK), which may be specific to an advertiser and may have been provisioned to the protected environment, e.g., from ad network 204 or another entity. Similarly, a secure processing environment may include a signing key, which may be used to sign data stored within the secure processing environment, such as ad statistics. Moreover in instances where a secure processing environment is a memory enclave, it may contain an enclave sealing key which may be used to "seal" data to the enclave, i.e., to encrypt data such that it may be only decrypted by an enclave possessing the enclave sealing key.

The secure processing environments on the client devices of the present disclosure may also include other information, such as attestation information that may be used to attest to the authenticity and/or security of the secure processing environment. Non-limiting examples of attestation information include information regarding the vendor, make, model, and/or version of a secure processing environment. Attestation information may alternatively or additionally include information regarding software, policies, device pairings, etc. that may be executed and/or enforced by the secure processing environment. Likewise, attestation information may include one or more private keys, which may be specific to each secure processing environment and may be used to attest the authenticity of one secure processing environment to another using a suitable attestation protocol, as will be described later.

The client devices of the present disclosure may further include a context information management module (CIMM), which may be defined and/or be executed within a secure processing environment, such as a TEE or a memory enclave, as described above. This concept is illustrated in FIG. 2, which depicts client devices $201_1$, $201_2$, $201_y$ as including CIMM $202_1$, CIMM $202_2$, and CIMM $202_y$, respectively.

In general, the CIMM is trusted by a user of a client device to perform several trusted functions with respect to the distribution of advertisements and the collection of advertising statistics. In some embodiments for example, a CIMM may be trusted to use local context information to determine which ads may be of interest to a user of a client device. Local context information may be any of a number of different parameters, such as a user's identity, information contained in a user profile, information gleaned from sensor(s) coupled or included in a client device (not illustrated in FIG. 2), location information, time of day, network connections made by a client device, content viewed on a client device (e.g., through a web browser), usage/browser history, combinations thereof, etc. Because local context information may be privacy sensitive, the client devices described herein are preferably configured such that local context information is stored within a secure processing environment, such as a TEE or memory enclave, as described above. In this way, the local context information may be protected from disclosure to unauthorized parties, such as malware, hackers, and the like.

As noted previously, a CIMM may use local context information to select ads for presentation to a user of a client. In some embodiments, a CIMM may be configured to base the selection of ads for display on a comparison of the local context information to dimensions specified by an advertiser in connection with one or more ads supplied to an ad network (e.g., ad network 204), and ultimately to client devices participating in the advertising system (e.g., client devices $201_1$, $201_2$, $201_y$, etc.).

This concept is generally illustrated in FIG. 2, wherein CIMMs $202_1$, $202_2$, $202_y$ are illustrated as providing M of N ads to ad publishers $203_1$, $203_2$, $203_y$, respectively. In this regard, M may equal 0, N (as described above), or a subset of N, reflecting that none, all, or some of the ads supplied to client devices $201_1$, $201_2$, $201_y$ were selected for display, e.g., by corresponding ad publishers $203_1$, $203_2$, $203_y$, etc.

As illustrated in FIG. 2 and mentioned above, the client devices of the present disclosure may include an ad publisher, such as ad publishers $203_1$, $203_2$, $203_y$, etc. in client devices $201_1$, $201_2$, and $201_y$, respectively. An ad publisher may be in the form of software and/or a module that is executed by the client device's processor, e.g., in the context of an operating system. In general, an ad publisher functions at least in part to provide space for the display of advertisements selected by a CIMM consistent with the present disclosure. Thus for example, an ad publisher may be in the form of a web browser, an application, an operating system notification sub-system, or other software which provides banner or other screen space for the display of advertisements selected by a CIMM, e.g., on a display of a client device.

In addition to selecting ads for display, the CIMMs described herein may be configured to collect advertising statistics in a privacy sensitive manner. More specifically and as will be described in detail below, each CIMM may be configured to collect ad statistics for each ad that is displayed via an ad publisher, and to construct a vector using additive homomorphic encryption (AHE) that other CIMMs may use for the tabulation of ad statistics. As may be understood, in a homomorphic encryption system, given a public additive homomorphic encryption key (PAHEK, also referred to as PK) and cipher texts E(PK; x1) and E(PK; x2), it is possible to create the cipher text E(PK; x1+x2) without knowledge of x1 and x2. Similarly, given E(PK; x), it is possible to create the cipher text E(PK; c·x) for any scalar, c. In the context of this disclosure, x1 may correlate to ad statistics collected from a first client (e.g., client $201_1$), x2 may be ad statistics collected from a second client (e.g., client $201_2$). Of course, additive homomorphic encryption may be extended to greater than two clients, and thus may further include $X_y$, where Xy may be ad data collected from a yth client, such as client $201_y$.

Returning to the example of FIG. 2, each advertiser may transmit a collection of ads and its PAHEK to ad network 204. Accordingly, the transmission of Adv1 Ads, Adv2 Ads, Adv3 Ads, etc. may be represented as follows: Adv1 Ads= [(Pk$_{adv1}$, Ad1, Ad2, Ad3 . . . )], Adv2 Ads=[(Pk$_{adv2}$, Ad1, Ad2, Ad3 . . . )], Adv3 Ads=[([(Pk$_{adv3}$, Ad1, Ad2, Ad3 . . . )], etc. As noted previously, ad network 204 may forward a collection of N ads to clients 201$_1$, 201$_2$, 201$_y$, etc. In addition, ad network 204 may forward to a client the PAHEKs that are relevant to the ads that are communicated to a client. Thus for example, if ad network communications three ads (ad1, ad2, ad3) from advertisers 1, 2, X to client 201$_1$, such communication may be represented as follows: N Ads=RPKadv$_1$, ad1, ad2, ad3), (PKadv$_2$, ad1, ad2, ad3), (PKadv3, ad1, ad2, ad3). Communications between ad network 204 and clients 201$_2$, 201$_y$ may be similarly represented, albeit tailored to the relevant ads in the communication. Accordingly, each CIMM in system 200 may receive a collection of ads and corresponding PAHEKs.

Ad network 204 and/or advertisers 1, 2, and X may wish to receive cost accounting information regarding ads displayed on clients participating in system 200. In such instance, ad network 204 and/or advertisers 1, 2 and/or X may assign a cost to each ad that is delivered to client 201$_1$. A scalar may be used to reflect this cost, such that: N Ads=RPKadv$_1$, (ad1:c1adv$_1$), (ad2:c2adv$_1$), (ad3:c3adv$_1$)), (PKadv$_2$, (ad1:c1adv$_2$), (ad2:c2adv$_2$), (ad3:c3adv$_2$)), (PKadv3, (ad1:c1adv$_x$), (ad2:c2adv$_x$), (ad3:c3adv$_x$)) where c1adv$_1$, c2adv$_1$, and c3adv$_1$ are scalars representative of the cost of each delivery of ad1, ad2, and ad3, respectively, for advertiser 1, c1adv$_2$, c2adv$_2$, and c3adv$_2$ are scalars representative of the cost of each delivery of ad1, ad2, and ad3, respectively, for advertiser 2, and c1adv$_x$, c2adv$_x$, and c3adv$_x$ are scalars representative of the cost of each delivery of ad1, ad2, and ad3, respectively, for advertiser X. For simplicity, such scalars may be individually or collectively referred to herein as "cost information." It should be understood that cost information may differ between ads and between advertisers, and that each advertiser may supply the same or different ads than other advertisers.

As noted above, a CIMM may select ads suitable for display by an ad publisher and collect advertising statistics relevant to such ads. For example, CIMM 202$_1$, may be configured to select ads for display by ad publisher 203$_1$, e.g. using local context information or another mechanism. This concept is illustrated in FIG. 2, which illustrates CIMM 202$_1$ as selecting M of N ads for display by ad publisher 203$_1$, where M is less than or equal to N (including 0).

In addition, CIMM 202$_1$ is configured to collect statistics for each ad that is selected for publication. Non-limiting examples of such ad statistics include the user interaction history relative to a set of displayed ads. For example, CIMM 202$_1$ may collect statistics regarding user click throughs, ignores, which display real estate was used to display an ad, whether a uniform resource locater (URL) was provided, posts to social media websites, shopping cart activity, other ad impression statistics, combinations thereof, and the like. In some embodiments, a CIMM may collect such information by monitoring input output devices (e.g., keyboard, mouse, touch screen, etc.) of a client device using one or more trusted input/output technologies, such as a secure display path technology (e.g. INTEL® protected audio video pathway (PAVP)). Of course, other methods for collecting ad statistics may be used.

Once a CIMM has collected ad statistics for an ad or set of ads, it may encrypt such statistics in a privacy sensitive manner. Thus for example, CIMM 201$_1$ may collect ad statistics for each ad that is displayed by ad published 203$_1$ on client 201$_1$. A CIMM may then calculate a vector that includes a truth table to identify which ads of an advertiser were displayed by an ad publisher, and which ads were not displayed. The truth table may be configured such a first numeral (e.g., 1) is used to identify ads that were displayed, and a second numeral (e.g. 0) is used to identify ads that were not displayed. The vector may then be calculated by encrypting the truth table for each advertiser by with a PK specific to the relevant advertiser.

Returning to the previously discussed example, advertisers 1, 2 and X may each supply three ads (ad1, ad2, ad3) and a unique PK (i.e., PKadv$_1$ for advertiser 1, PKadv$_2$ for advertiser 2, and PKadv$_x$ for advertiser X) to ad network 204 and, ultimately, to a CIMM such as CIMM 202$_1$. Each CIMM may select which of the three ads provided by each advertiser is to be displayed from each advertiser, using local context or another methodology and/or dimensions specified for each ad by its respective advertiser. For example, CIMM 202$_1$ may determine that only ad2 from advertiser 1 is to be displayed by ad publisher 203$_1$, only ad1 and ad3 from advertiser 2 is to be displayed by ad publisher 203$_1$, and only ad3t from advertiser X is to be displayed by ad publisher 203$_1$. Each CIMM may then calculate a vector (V) by representing the display of ad1, ad2, and ad3 in a truth table according to each advertiser. That is, the vector V may be represented using example notation (I) below:

$$V=[(\text{PKadv}_1,0,1,0),(\text{PKadv}_21,0,1),(\text{PKadv}_x,0,0,1)] \quad (\text{I})$$

Put in other terms, an ad campaign may involves multiple ads and may involve multiple advertisers. An ad network may bundle several ads that are delivered to the CIMM of various client devices, including CIMM 201$_1$. CIMM 201$_1$ determines which ads are appropriate to show on client 201$_1$. Vector V identifies which ad was shown on a first client device and which was not e.g. (0,1,0), (1,0,1).

CIMM 201$_1$ may then be configured to encrypt vector V using each advertisers PK, and with the cost information for each ad multiplied by each entry in the truth table, so as to produce an first encrypted vector EV1 as shown in example notation (II):

$$\begin{aligned}\text{EV1}=&[E(\text{PKadv}_1,(0*C1\text{adv}_1),(1*C2\text{adv}_1),\\&(0*C3\text{adv}_1)),E(\text{PKadv}_2,(1*C1\text{adv}_2),(0*C2\text{adv}_2),\\&(1*C3\text{adv}_2)),E(\text{PKadv}_x,(0*C1\text{adv}_x),E(\text{PKadv}_3,\\&(0*C1\text{adv}_3),E(\text{PKadv}_3,(1*C1_{adv3}))]\end{aligned} \quad (\text{II})$$

Notation (II) above may be simplified to the example notation (III) below:

$$\begin{aligned}\text{EV1}=&[0,E(\text{PK}_{adv1},(1*C2\text{adv}_1),0,E(\text{PK}_{adv2},\\&(1*C1\text{adv}_2),0,E(\text{PK}_{adv2},(1*C3\text{adv}_2),0,0,E\\&(\text{PK}_{adv3},(1*C1\text{adv}_3)];\end{aligned} \quad (\text{III})$$

To guard against the privacy concerns presented by a low distribution ad campaign, the CIMMs described herein may associate a statistics collection counter (S) with an encrypted vector (EV), and may increment S each time an EV is tabulated. Thus, for a given EV:

$$\text{EV}:S \rightarrow \text{EV}:S' \quad (\text{IV})$$

Where S is an initial counter value and S' is an incremented counter value. A CIMM may then compare S' to a threshold statistics collection value (TSCV). The TSCV may be maintained within the secure processing environment of a client device, and may represent a threshold sample size at which ad statistics may be reported to an ad network and or an advertiser. In some embodiments the threshold sample size may be specified based on the preferences of a user of a client device. Without limitation, the threshold sample size is sufficiently large as to make it practically difficult or impossible for an ad network and/or advertiser to associate collected ad data with a particular user, and/or attributes of a particular user.

Accordingly, the TSCV may be any value greater than 1, such as but not limited to greater than or equal to 10, 20, 30, 50, 100, 1000, 10,000, 100,000, 1,000,000, 2,000,000 or more, values there between, and ranges that may be defined using values as endpoints. Of course, such TSCV are exemplary only, and any suitable TSCV may be used. Thus in the example of FIG. 2, CIMM $202_1$ may associate EV (where EV=EV1) with a counter value S, and may increment S (to S') once EV1 is calculated.

If S' is greater than or equal to TSCV, a CIMM may forward an EV to an ad network and/or to an advertiser, which may decrypt the EV using one or more private keys corresponding to the respective PK's used to encrypt the truth table values associated with the ads supplied by a particular advertiser. If S' is less than TSCV however, a CIMM may forward an EV to a CIMM of second client device for further statistical tabulation. In addition, S' may be forwarded to the CIMM of the second client. More specifically and as will be described below, the other CIMM may calculate a second vector V2 and produce a second encrypted vector (EV2) that is specific to ads, advertisers, and PKs supplied to it. The other CIMM may then combine EV1 and EV2 using homomorphic encryption, so as to provide a second EV, i.e., EV', where EV'=E(EV1+EV2).

After the second client (CIMM) has calculated EV', it may further increment S', and compare the further incremented counter value (S' to S") to the TSCV. If S" remains less than TSCV, the second client may forward EV (where EV=EV') and S" to a third client for additional statistical tabulation to produce a third vector (V3) and a third encrypted vector (EV3), and to combine EV3 with EV' using additive homomorphic encryption to produce a third EV, i.e., EV"', where EV"=E(EV'+EV3). The CIMM of the third client may then further increment S" (S" to S"') to produce yet another incremented counter value (S"') and compare S' to The TSCV. This process may continue until S' is equal to or greater than TSCV, at which point a client may forward the EV (or EV', EV", EV"', etc.) and S' to an ad network and/or an advertiser.

This concept is shown in FIG. 2, which depicts CIMM $202_1$ as transmitting EV (where EV=EV1) and S' to CIMM $202_2$, which is executed within a secure processing environment of client $201_2$. Thus, FIG. 2 may be understood as depicting an example wherein the value of S' associated with EV is less than a threshold statistics collection value (TSCV) maintained in a secure processing environment of client $201_1$. Similar to CIMM $202_1$, CIMM $202_2$ may be trusted by a user of client $201_2$ to perform ad selection and/or statistics collection operations in a privacy sensitive manner.

Communication of EV and S' between CIMMS such as CIMM $202_1$ and CIMM $202_2$ may preferably occur over a secure wired or wireless communications link established between client devices consistent with the present disclosure, such as client $201_1$ and client $201_2$, respectively. For example, communications between CIMMS and/or clients may take place using a secure communications channel such as may be provided using transport layer security (TLS), a sign and mac (SIGMA) session, combinations thereof, and the like.

One purpose of the secure communications link between clients/CIMMS such as client $201_1$ and client $201_2$ may be to prevent third parties such as ad network 204, advertisers 1, 2, X, etc., from intercepting an EV and S' before a sufficient ad distribution is achieved. As may be appreciated, ad network 204 and advertisers 1, 2, and X may be interested in prematurely intercepting an EV, as either or both of them may possess the keys needed to decrypt an EV to obtain statistics that may be easily correlated to the interests and/or identity of a user of client $201_1$.

Establishment of a secure communications link between first and second clients/CIMMS such as client $201_1$ and client $201_1$ (or more specifically CIMM $202_1$ and CIMM $202_1$) may be conditioned on successful verification of the authenticity and/or identity of the CIMMs executed by such clients, such as CIMM $202_1$ to CIMM $202_2$. Therefore in the example of FIG. 2, CIMM $202_1$ and CIMM $202_2$ may be configured to execute an attestation protocol so that they may verify the authenticity and/or identity of each other. In this regard, CIMM $202_1$ and CIMM $202_2$ may exchange attestation information (e.g., maintained in respective secure processing environments of clients $201_1$ and $201_2$) via one or more attestation messages, prior to the transmission of EV1 or S'.

In some embodiments verification of the identity and/or authenticity of a first and second CIMM such as CIMM $202_1$ and CIMM $202_2$ may be carried out using one or more electronic signature protocols, such as the INTEL® Enhanced Privacy Identification (EPID) cryptosystem, the direct autonomous attestation (DAA) protocol, a remote anonymous attestation (RAA) protocol, a SIGMA (sign and message authentication code (MAC)) protocol, combinations thereof, and the like combinations thereof, and the like.

EPID is a specialization of DAA with enhanced revocation properties. Details regarding the EPID and DAA cryptosystems may be found in E. Brickell and Jiangtao Li, "Enhanced Privacy ID: A Direct Anonymous Attestation Scheme with Enhanced Revocation capabilities," Aug. 17, 2007 and Brickell et al., "Direct Autonomous Attestation," $11^{th}$ ACM Conference on Computer and Communications Security, Oct. 25-29, 2004. Generally, EPID and DAA permit data to be signed with an enhanced privacy identifier (e.g., an EPID private key) that is unique to one device, and which may be verified using a corresponding public key (e.g., an EPID public key) that is distributed among various other devices.

Accordingly in some embodiments, the client devices described herein may store (e.g., in a secure processing environment) a private key that is specific to each of their respective CIMMs, and which may be used in EPID or DAA. The client devices also may store each other's public keys in their respective secure processing environments. In some embodiments a first CIMM such as CIMM $202_1$ may use its private key to sign data in an attestation message sent to a second CIMM such as CIMM $202_2$, and the second CIMM may use its private key to sign an attestation message sent to the first CIMM. The first CIMM may then use the public key of the second CIMM to verify the signature of the data in an attestation message received from the second CIMM, and thus verify that the second CIMM has possession of the second CIMM's private key.

Likewise the second CIMM may use the public key of the first CIMM to verify the signature of the data in an attestation message received from the first CIMM, and thus verify that the first CIMM has possession of the first CIMM's private key. If both signatures are verified the first CIMM may be confident that messages from the second CIMM are authentic, and vice versa. Alternatively or additionally, verification of the identity and/or authenticity of a first and second CIMM may be performed using a trusted third party verification system.

If such verification successfully completes (or is not required), a secure communications link may be established between the first CIMM and the second CIMM. In some embodiments, the first and second CIMMs may negotiate a mutually supported secure communications type, e.g., during the performance of attestation and verification. In such instances, each CIMM may represent to the other which secure communication links it (or its client) supports, e.g., in one or more attestation messages.

For example one or both of a first and second CIMM (e.g., CIMM $202_1$ and CIMM $202_2$ in FIG. 2) may specify that it wishes to use a public key encryption protocol to secure messages transmitted between each other. In such a protocol, the first and second CIMM may establish a secure communications link in which they encrypt messages to one another using their respective public keys. The first client can decrypt the messages from the second client using the first client's private key, and the second client can decrypt messages from the first client using the second client's private key.

Thus in the example of FIG. 2, CIMM $202_1$ may encrypt messages to CIMM $202_2$ using the public key of client $201_2$ (or more specifically, CIMM $202_2$), and CIMM $202_2$ may encrypt messages to Client $201_1$ using the public key of client $201_1$ (or more particularly CIMM $202_1$). Clients $201_1$ and $201_2$ (or more specifically CIMM $202_1$ and CIMM $202_2$) may decrypt those encrypted messages using their corresponding private keys. Using such a protocol client $201_1$ (or more particularly CIMM $202_1$) may securely transmit EV and S' to client $201_2$ (or more particularly, CIMM $202_2$).

First and second clients (or more particularly, first and second CIMMS) may alternatively or additionally specify that a secure communications link is to be established based on the use of a shared session key (SSK) that may be used to encrypt messages between them. Thus for example, the first and second clients (or their respective CIMMs) may execute a sign and message authentication code (SIGMA) protocol or another suitable protocol for establishing an SSK. One example of a suitable SIGMA protocol that may be used for this purpose is the modified Sigma protocol described in "SIGMA, the Sign-and-Mac Approach to Authenticated Diffie-Hellman and its Use in the IKE protocol," Hugo Krawczyk, Proceedings of Crypto 2003, Springer-Verlag Lecture Notes in Computer Science No. 2729, p. 399.

If used, the SSK negotiated by the first and second clients (or their respective CIMMs) may be ephemeral, or it may be permanent. If ephemeral the SSK may remain valid for a set number (e.g., 1, 2, etc.) of sessions or for a set time period, after which a new SSK may be needed. In any case, the first and second clients (or their respective CIMMs) may use the SSK to encrypt messages to one another while the secure communications link is active. Because they each have knowledge of the shared session key, the first client may decrypt messages received from the second client that are encrypted with the SSK, and vice versa. In this way, the first and second client (and/or their respective CIMMs) may securely exchange EV and S' using an SSK.

Thus in the example of FIG. 2, CIMM $202_1$ and CIMM $202_2$ may agree to encrypt messages to one another using an SSK, as generally described above. In this regard, CIMM $202_1$ may encrypt a message containing EV (where EV=EV1) and S' using the SSK, and may send the encrypted message to CIMM $202_2$. CIMM $202_2$ may use the SSK to decrypt the message (e.g., within a secure processing environment of client $201_2$, thereby obtaining EV and S'. Communication of an EV and S' between other CIMMs consistent with the present disclosure may be performed similarly.

Returning to the example of FIG. 2, CIMM $202_1$ may calculate a vector V1 and an encrypted vector EV (where EV=EV1), and increment statistics counter value S to an encrypted statistic counter value S'. Upon determining that S' is less than a threshold statistics collection value (TSCV) may transmit encrypted ad statistics EV1 (where EV=EV1) and S' to a CIMM of second client device, in this case CIMM $202_2$ of client $201_2$. Because the ad statistics included in EV (in this case, cost values) are encrypted with a public homomorphic encryption key, it cannot decrypt EV to obtain the statistics in V1. CIMM $202_2$ does not have knowledge of the values of V1. Rather, it only has knowledge that EV1 was tabulated and associated with the incremented statistics counter value, S'. Nonetheless, CIMM $202_2$ may use EV1 in an additive encryption process as described below.

With this in mind, CIMM $202_2$ in some embodiments is configured to perform ad selection and statistics collection operations that are similar to those performed by CIMM $202_1$, but which are specific to the ads, public additive homomorphic encryption keys, etc. provided to client $201_2$, e.g., from ad network 204. For example, CIMM $202_2$ may select ads for display by ad publisher $203_2$ (e.g., using local context relevant to client $201_2$ or some other method) and may collect ad statistics relevant to the displayed ads in the same or similar manner as CIMM $202_1$ performs those functions for client $201_1$.

Similarly, CIMM $202_2$ may generate a vector (V2) that includes a truth table identifying which ads were displayed on ad publisher $203_2$, and which ads were not displayed in a similar manner as performed by CIMM $202_1$. V2 may be encrypted (e.g., using PK's specific to advertisers that produced ads displayed by ad publisher $203_2$) with cost information relevant to each ad multiplied by corresponding values of the truth table, so as to produce a second encrypted vector EV' that additively includes V2 with EV (where EV=EV1). This encryption may be represented using notation (V) below:

$$EV'=E(EV1+V2) \qquad (V)$$

where EV1 may be represented by exemplary notation (III) above, and V2 may be notated as represented by exemplary notation (I) above but with values specific to the ad statistics collected by CIMM $202_2$ with respect to the ads displayed on ad publisher $203_2$.

CIMM $202_2$ may then further increment S', and compare the further incremented value (S") to the threshold statistics collection value (TSCV), which may be maintained within the secure processing environment of client $201_2$. If S" is greater than or equal to the TSCV, CIMM $202_2$ may communicate EV' to ad network 204 and/or one or more of advertisers 1, 2, and X.

If S" is less than the TSCV however, CIMM $202_2$ may communicate EV' and S" to CIMM $202_y$ to a CIMM of another client, e.g., CIMM $202_y$ executed on client $201_y$, as shown in FIG. 2. Like the communication of EV and S' to CIMM $202_2$, communication of EV' and S" from CIMM $202_2$ to CIMM $202_3$ may occur over a secure communications link, as discussed above. Establishment of that secure communications link may be conditioned on successful completion of an attestation protocol between CIMM $202_2$ and CIMM $202_y$, which may be performed in the same or different manner as described above with respect to the attestation protocol that may be executed between CIMM $202_1$ and CIMM $202_2$.

If attestation between CIMM $202_2$ and CIM $202_y$ successfully completes (or is not required), a secure communications link may be established using TLS, SIGMA, or another protocol, as described above. CIMM $202_2$ may then transmit an encrypted message containing EV' and S" to CIMM $202_y$, e.g., in the same or similar manner as the transmission of EV and S' from CIMM $202_1$ to CIMM $202_2$.

Like CIMMs $202_1$ and $202_2$, CIMM $202_y$ may be implemented within a secure processing environment of client $201_y$, and may be trusted to perform ad selection and ad statistics collection in for client $201_y$ in a privacy sensitive manner. Accordingly, CIMM $202_y$ may select ads for display on ad publisher $203_y$ and collect ad statistics for the displayed ads in the same manner as described above with respect to the functions CIMMs $202_1$ and $202_2$. CIMM $202_y$ may process those statistics to calculate a third vector V3 and to additively encrypt V3 with EV' (where EV'=E(EV1+V2) using additive homomorphic encryption to produce a third encrypted vector EV", which may be represented by exemplary notation (VI) below:

$$EV''=E(E(EV1+V2),V3) \qquad (V)$$

where EV'=E(EV1+V2), and V3 may be represented by exemplary notation (I) above but with values specific to the ad statistics collected by CIMM $202_2$ and CIMM $202_3$, respectively.

CIMM $202_y$ may then increment S", and compare the further incremented value (S''') to the threshold statistics collection value (TSCV), which may be maintained within the secure processing environment of client $202_y$. If S''' is less than the TSCV CIMM $202y$ may transmit EV''' and S''' to yet another client for further ad statistics tabulation and further incrementing of the statistics collection counter. This process may continue with still further client devices until the value of the incremented statistics collection counter is greater than or equal to the TSCV. This concept is illustrated in FIG. 2 thought the use of the subscript y, where subscript y may be an integer value greater than or equal to 3.

Put in other terms, the CIMMS of varios client devices of the present disclosure may collect add statistics from their respective clients, produce a vector representative of those ad statistics, and encrypt those ad statistics with encrypted ad statistics produced by other participating CIMMs. This process can be generally represented by notation (VI) below:

$$EV'_y = \Sigma E(EV^{y-1}, V^y) \qquad (VI)$$

where y is an integer greater than or equal to 1 and represented the number of a participating CIMM, $EV'_y$ is the encrypted statistics produced by a yth CIMM, $EV^{y-1}$ is the encrypted statistics received by a yth CIMM from a previous (y−1) CIMM, $V^y$ is the statistics vector produced by a yth CIMM, and where $EV^0 = 0$ In any case, once the incremented value of S is greater than or equal to the TSCV, a CIMM may forward an encrypted vector (EV, where EV may=EV1, EV', EV", EV'''etc.) to ad network 204 and/or one or more of advertisers 1, 2, and X. This concept is illustrated in FIG. 2, wherein CIMM $202_y$ is illustrated as transmitting EV" and S''' to ad network 204.

An ad network and/or an advertiser may be in possession of one or more private additive homomorphic encryption keys that correspond to the public additive homomorphic encryption key(s) that was (were) used to produce the encrypted vector. Accordingly, the ad network and/or advertiser may use its private key(s) to decrypt the encrypted vector(s) it receives, thereby obtaining the ad statistics and cost information contained therein. The ad network and/or advertiser may then return an empty EV and reset statistics collection counter (S) to a client device, and the process may continue again until an S' is greater than or equal to the TSCV, at which an EV may again be transmitted to the ad network and/or advertiser. As a result, the functionality of the CIMMs described herein may result in a periodic disclosure of ad statistics to an ad network and/or an advertiser, when an incremented statistics counter value (S') is greater than or equal to a threshold statistics collection value (TSCV)

Because EV is reported to an advertiser when S' is greater than or equal to the TSCV, EV may include significant quantities of ad statistics that are distributed and dissociated among a plurality of users and/or client devices. As a result, it may be practically difficult or impossible for an ad network or advertiser to correlate the ad statistics and cost information with any specific user, the interests of a specific user, and/or any specific client device.

Figure 3:
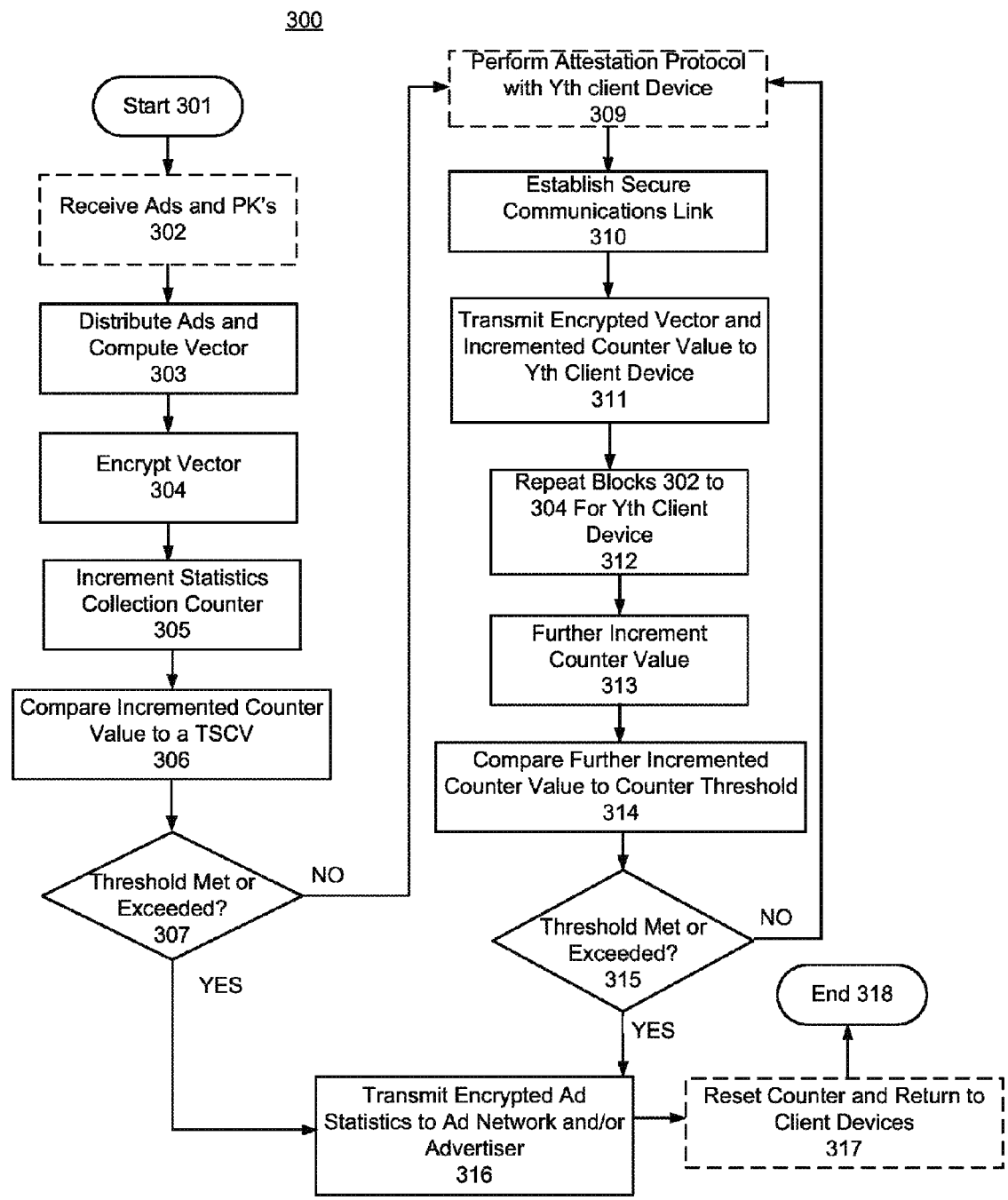
FIG. 3 is a flowchart of exemplary operations of one example of a method of collecting advertising statistics consistent with the present disclosure.

Another aspect of the present disclosure relates to methods of collecting ad statistics in a privacy sensitive manner. In this regard reference is made to FIG. 3, which depicts exemplary operations of a method of collecting ad statistics consistent with the present disclosure. As shown, the method 300 begins at block 301. The method may then proceed to optional block 302, wherein a first CIMM (e.g., of a first client device) consistent with the present disclosure may receive a plurality of advertisements and one or more public additive homomorphic encryption keys (PAHEKs or PKs) associated with such ads.

As explained above in the description of FIG. 2, various ads received by the first CIMM may be produced by different advertisers and/or supplied by different ad networks, each of which may have its own PK. As a result, the ads received by a CIMM may be associated with a PK that is specific to the advertiser that produced the ad and/or the ad network that supplied the ad to the CIMM. Block 302 is shown with hashed lines to represent its optional status, as it is not necessary for a CIMM to receive ads and PKs from an outside source, such as an advertiser or ad network. For example, a CIMM may have been pre-provisioned with a plurality of ads and associated PKs in some other manner, such as via the creation of ads by the CIMM itself or the CIMMs host client device. In any case, ads and PKs may be stored by the CIMM within a secure processing environment of the CIMMs host client device.

The method may then proceed to block 303, wherein the first CIMM may select ads for distribution to an ad publisher on a first client device, which hosts the first CIMM in a secure processing environment as generally discussed above. The first CIMM may then collect ad statistics regarding each ad, and may calculate a vector that represents those statistics. For example, the first CIMM may calculate a truth table representing which ads were displayed by the ad publisher on the first client device, and which ads were not displayed. This concept is discussed in detail above in connection with FIG. 2, and thus is not reiterated for the sake of brevity.

The method may then proceed to block 304, wherein the first CIMM may encrypt the vector (V) produced pursuant to block 303, using additive homomorphic encryption and the PKs associated with each ad represented in the vector, as generally described above with respect to FIG. 2. The resulting encrypted vector (EV, where EV=EV1 and EV1=the encrypted vector specific to the first client device).

The method may then proceed to block 305, wherein the first CIMM may increment a statistics collection counter (S) associated with the encrypted vector (EV), so as to result in an incremented statistics collection counter value S'. The method may then proceed to block 306, wherein the first CIMM may compare the incremented statistics collection counter value S' to a threshold statistics collection value (TSCV).

The method may then proceed to diamond 307, wherein the CIMM may make a determination as to whether S' is greater than or equal to TSCV? If so, the method may proceed to block 316, wherein the first CIMM may transmit EV to an ad network or an advertiser that produced and/or provided the ads that were displayed on the first client device. If S' is less than TSCV, however, the method may proceed to optional block 309, wherein the first CIMM may execute an attestation protocol with a Yth CIMM hosted in a secure processing environment of a Yth client device, where Y is an integer value greater than or equal to 2. A description of some example attestation protocols that may be executed between two CIMMs was provided previously in connection with FIG. 2, and thus is not reiterated for the sake of brevity.

If attestation between the first and Yth CIMMs successfully completes or is not required, the method may proceed to block 310, wherein a secure communications link between the first client device (or the first CIMM) and the Yth client device (or the Yth CIMM) may be established, e.g., using TLS, SIGMA, or some other secure communications protocol, as previously described.

Once a secure communications link has been established, the method may proceed to block 311, wherein the first CIMM may transmit the encrypted vector (EV, where EV=EV1) and the incremented statistics counter value (S') to the Yth client device. The method may then proceed to block 312, wherein the operations of blocks 302 to 204 may be repeated by the Yth CIMM, but with respect to the ads and statistics specific to the Yth device. As a result, the second CIMM may produce a Yth vector ($EV_y$) which represents statistics generated by the display of ads on the Yth client device, and which is encrypted using additive homomorphic encryption and the PKs specific to the ads of the Yth client device. The Yth CIMM may also combine $EV_y$ with EV1 to produce a second encrypted vector EV'. Using additive homomorphic encryption, as generally discussed above with respect to FIG. 2.

Once EV' has been generated by a Yth CIMM, the method may proceed to block 313, wherein the Yth CIMM may further increment the statistics collection counter. For example, where a Yth CIMM has received S' from a first CIMM, it may increment S' after calculated EV', so as to produce a further incremented statistics counter value, S''. The method may then proceed to block 314, wherein the Yth CIMM may compare the further incremented value to the TSCV, which may be maintained within the secure processing environment of the Yth client device.

The method may then proceed to diamond 315, wherein a Yth CIMM may determine whether a further incremented counter value is greater than or equal to the TSCV. If not, the method may loop back to block 309, wherein the Yth CIMM may perform an attestation with yet another Yth CIMM (e.g., Y+1) hosted on another Yth client device, and the method may continue with the Yth CIMM performing the functions of at least blocks 310-314 and diamond 315. This loop may continue through various client devices and CIMMs until the incremented statistics counter value exceeds the TSCV, at which time the method may proceed to block 316.

As noted above, pursuant to block 316 a CIMM may transmit the additive homomorphically encrypted vector (in the form of EV, EV', EV'', etc.) containing encrypted ad statistics to an ad network and/or an advertiser. The method may then proceed to optional block 317, wherein the ad network and/or advertiser may decrypt the encrypted vector and ad statistics contained therein using one or more private keys corresponding to the public additive homomorphic encryption keys used to produce the encrypted vector. The ad network and/or advertiser may then reset the statistics counter value (e.g., S'→S) and return the reset counter value and an empty encrypted vector (EV) to a client device, whereupon method 300 may repeat. Alternatively, the method may proceed to block 318 and end.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SOC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions.

EXAMPLES

The following examples pertain to further embodiments. The following examples of the present disclosure may comprise subject material such as a system, a device, a method, a computer readable storage medium storing instructions that when executed cause a machine to perform acts based on the method, and/or means for performing acts based on the method, as provided below.

Example 1

According to this example there is provided a system for collecting advertising statistics, the system including a first client device including an ad publisher and a secure processing environment, the secure processing environment including a context information management module (CIMM) that is operable to: compute, within the secure processing environment, ad statistics for each advertisement of a plurality of advertisements that is delivered to the ad publisher for display on the first client device, each of the ad statistics being correlated to a statistics collection counter; encrypt, within the secure processing environment, the ad statistics using additive homomorphic encryption, so as to produce encrypted ad statistics; increment the statistics collection counter such that it has an incremented value; and compare the incremented value to a threshold statistics collection value; wherein if the incremented value is less than the threshold statistics collection value, the CIMM is further operable to transmit the encrypted ad statistics to a second client device; and if the incremented value is greater than or equal to the threshold statistics collection value, the CIMM is further operable to transmit the encrypted ad statistics to an ad network.

Example 2

This example includes any or all of the elements of example 1, wherein the secure processing environment is selected from the group consisting of a trusted execution environment (TEE), a memory enclave, or a combination thereof.

Example 3

This example includes any or all of the elements of any one of examples 1 and 2, wherein the CIMM is operable to compute the first ad statistics with the following operations including: computing a vector for each of the plurality of ads, wherein a value of the vector is indicative of whether a respective one of the plurality of advertisements has been delivered to the ad publisher for display on the first client device; and multiplying each value of the vector with cost information for an advertisement to which the value pertains, so as to obtain a plurality of multiplied vector values, each multiplied vector value corresponding to one of the plurality of advertisements.

Example 4

This example includes any or all of the elements of example 3, wherein the CIMM encrypts the ad statistics by at least encrypting the plurality of multiplied vector values using the additive homomorphic encryption.

Example 5

This example includes any or all of the elements of any one of examples 1 to 4, wherein the CIMM is further operable to receive at least a first public homomorphic encryption key (first PAHEK), and to perform the additive homomorphic encryption at least in part with the first PAHEK.

Example 6

This example includes any or all of the elements of example 5, wherein the CIMM receives the first PAHEK from the ad network.

Example 7

This example includes any or all of the elements of any one of examples 5 and 6, wherein the CIMM is further operable to seal the first PAHEK to the secure processing environment.

Example 8

This example includes any or all of the elements of any one of examples 5 to 7, wherein the first PAHEK is associated with advertisements produced by a first advertiser of a plurality of advertisers participating in the ad network.

Example 9

This example includes any or all of the elements of example 1, wherein: the plurality of advertisements include at least first advertisements from a first advertiser and second advertisements from a second advertiser, wherein the first advertisements are associated with a first public additive homomorphic encryption key (PAHEK) and the second advertisements are associated with a second PAHEK; the ad statistics include first ad statistics for the first advertisements and second ad statistics for the second advertisements; and the CIMM is further operable to encrypt the first ad statistics with the first PAHEK and the second ad statistics with the second PAHEK, respectively, so as to produce first and second encrypted ad statistics.

Example 10

This example includes any or all of the elements of example 9, wherein the first and second ad statistics are associated with first and second statistics collection counters, respectively; and the CIMM is further operable to: increment the first and second statistics collection counters such that they have a first incremented value and a second incremented value respectively; and compare the first and second incremented values to respective first and second threshold statistics collection values; wherein if: the first incremented value is less than the first threshold statistics collection value, the CIMM is further operable to transmit the first encrypted ad statistics to the second client device; the first incremented value is greater than or equal to the first threshold statistics collection value, the CIMM is further operable to transmit the first encrypted ad statistics to the ad network; the second incremented value is less than the second threshold statistics collection value, the CIMM is further operable to transmit the first encrypted ad statistics to the second client device; and the second incremented value is greater than or equal to the second threshold statistics collection value, the CIMM is further operable to transmit the first encrypted ad statistics to the ad network Example 11

This example includes any or all of the elements of any one of examples 1 to 7, wherein: prior to transmitting the encrypted ad statistics to the ad network or the second client device, the CIMM is operable to establish a secure communications channel with the ad network or the second client device, respectively.

Example 12

According to this example there is provided a system for collecting advertising statistics, the system including a second client device including an ad publisher and a secure processing environment, the secure processing environment including a first context information management module (CIMM) that is operable to:
receive encrypted first ad statistics and a first incremented statistics counter value from a first client device, wherein the first incremented statistics counter value is less than a threshold statistics counter value; compute, within the secure processing environment, second ad statistics for each advertisement of a plurality of advertisements that is delivered to the ad publisher for display on the second client device, each of the second ad statistics being correlated to a statistics collection counter; encrypt, within the secure processing environment, a sum of the encrypted first ad statistics and the second ad statistics using additive homomorphic encryption, so as to produce second encrypted ad statistics; increment the first incremented statistics counter value by a value of the second statistics collection counter, so as to produce a second incremented statistics counter value; and compare the second incremented statistics counter value to the threshold statistics collection value; wherein: if the second incremented statistics counter value is less than the threshold statistics collection value, the CIMM is further operable to transmit the second encrypted ad statistics to a third client device; and if the second incremented statistics counter value is greater than or equal to the threshold statistics collection value, the CIMM is further operable to transmit the second encrypted ad statistics to an ad network.

Example 13

This example includes any or all of the elements of example 12, wherein the secure processing environment is selected from the group consisting of a trusted execution environment (TEE), a memory enclave, or a combination thereof.

Example 14

This example includes any or all of the elements of any one of examples 12 and 13, wherein the CIMM is operable to compute the second ad statistics with the following operations including: computing a vector for each of the plurality of ads, wherein a value of the vector is indicative of whether a respective one of the plurality of advertisements has been delivered to the ad publisher for display on the second client device; and multiplying each value of the vector with cost information for an advertisement to which the value pertains, so as to obtain a plurality of multiplied vector values, each multiplied vector value corresponding to one of the plurality of advertisements.

Example 15

This example includes any or all of the elements of example 14, wherein the CIMM encrypts the second ad statistics by at least encrypting the plurality of multiplied vector values using the additive homomorphic encryption.

Example 16

This example includes any or all of the elements of any one of examples 12 to 15, wherein the CIMM is further operable to receive at least a first public homomorphic encryption key (first PAHEK), and to perform the additive homomorphic encryption at least in part with the first PAHEK.

Example 17

This example includes any or all of the elements of example 16, wherein the CIMM receives the first PAHEK from the ad network.

Example 18

This example includes any or all of the elements of any one of examples 16 and 17, wherein the CIMM is further operable to seal the first PAHEK to the secure processing environment.

Example 19

This example includes any or all of the elements of any one of examples 16 to 18, wherein the first PAHEK is associated with advertisements produced by a first advertiser of a plurality of advertisers participating in the ad network.

Example 20

This example includes any or all of the elements of any one of examples 12 to 19, wherein: prior to transmitting the second encrypted ad statistics to the ad network or the third client device, the CIMM is operable to establish a secure communications channel with the ad network or the third client device, respectively.

Example 21

According to this example there is provided a method for collecting ad statistics with a first client device including an ad publisher and a secure processing environment, including: receiving a plurality of advertisements within the secure processing environment; within the secure processing environment, computing ad statistics for each advertisement that is delivered to the ad publisher for display on the first client device, wherein each of the ad statistics is correlated to a statistics collection counter; encrypting, within the secure processing environment, the ad statistics using additive homomorphic encryption, thereby producing encrypted ad statistics; incrementing the statistics collection counter such that it has an incremented value; comparing the incremented value to a threshold statistics collection value; transmitting the first encrypted ad statistics to a second client device when the incremented value is less than the threshold statistics collection value; and transmitting the encrypted ad statistics to an ad network when the incremented value is greater than or equal to the threshold statistics collection value.

Example 22

This example includes any or all of the elements of example 21, wherein the secure processing environment is selected from the group consisting of a trusted execution environment (TEE), a memory enclave, or a combination thereof.

Example 23

This example includes any or all of the elements of any one of examples 21 and 22, wherein computing the ad statistics includes: computing a vector for each of the plurality of ads, wherein a value of the vector is indicative of whether a respective one of the plurality of advertisements has been delivered to the ad publisher for display on the first client device; and multiplying each value of the vector with cost information for an advertisement to which the value pertains, so as to obtain a plurality of multiplied vector values, each multiplied vector value corresponding to one of the plurality of advertisements.

Example 24

This example includes any or all of the elements of example 23, wherein encrypting the ad statistics includes encrypting the plurality of multiplied vector values using the additive homomorphic encryption.

Example 25

This example includes any or all of the elements of any one of examples 21 to 24, further including: receiving a first public homomorphic encryption key (first PAHEK) within the secure processing environment; and performing the additive homomorphic encryption at least in part with the first PAHEK.

Example 26

This example includes any or all of the elements of example 25, wherein the first PAHEK is received from the ad network.

Example 27

This example includes any or all of the elements of any one of examples 25 and 26, further including sealing the first PAHEK to the secure processing environment.

Example 28

This example includes any or all of the elements of any one of examples 25 to 27, wherein the first PAHEK is associated with advertisements produced by a first advertiser of a plurality of advertisers participating in the ad network.

Example 29

This example includes any or all of the elements of any one of examples 21 to 28, further including establishing a secure communications channel with the ad network or the second client device, prior to transmitting the encrypted ad statistics.

Example 30

According to this example there is provided a method for collecting advertising statistics using a second client device including an ad publisher and a secure processing environment, the method including: receiving encrypted first ad statistics and a first incremented statistics counter value from a first client device, wherein the first incremented statistics counter value is less than a threshold statistics counter value; receiving a plurality of ads within the secure processing environment; within the secure processing environment, computing second ad statistics for each advertisement that is delivered to the ad publisher for display on the second client device, wherein each of the second ad statistics is correlated to a statistics collection counter; encrypting, within the secure processing environment, a sum of the encrypted first ad statistics and the second ad statistics using additive homomorphic encryption, so as to produce second encrypted ad statistics; incrementing the first incremented statistics counter value by a value of the second statistics collection counter, so as to produce a second incremented statistics counter value; comparing the second incremented statistics counter value to the threshold statistics collection value; transmitting the second encrypted ad statistics to a third client device when the second incremented statistics counter value is less than the threshold statistics collection value; and transmitting the second encrypted ad statistics to an ad network when the second incremented statistics counter value is greater than or equal to the threshold statistics collection value.

Example 31

This example includes any or all of the elements of example 30, wherein the secure processing environment is selected from the group consisting of a trusted execution environment (TEE), a memory enclave, or a combination thereof.

Example 32

This example includes any or all of the elements of any one of examples 30 and 31, wherein computing the second ad statistics includes: computing a vector for each of the plurality of ads, wherein a value of the vector is indicative of whether a respective one of the plurality of advertisements has been delivered to the ad publisher for display on the second client device; and multiplying each value of the vector with cost information for an advertisement to which the value pertains, so as to obtain a plurality of multiplied vector values, each multiplied vector value corresponding to one of the plurality of advertisements.

Example 33

This example includes any or all of the elements of example 32, wherein encrypting the ad statistics includes encrypting the plurality of multiplied vector values using the additive homomorphic encryption.

Example 34

This example includes any or all of the elements of any one of examples 31 to 33, further including: receiving a first public homomorphic encryption key (first PAHEK) within the secure processing environment; and performing the additive homomorphic encryption at least in part with the first PAHEK.

Example 35

This example includes any or all of the elements of example 34, wherein the first PAHEK is received from the ad network.

Example 36

This example includes any or all of the elements of any one of examples 33 to 35, further including sealing the first PAHEK to the secure processing environment.

Example 37

This example includes any or all of the elements of any one of examples 34 to 36, wherein the first PAHEK is associated with advertisements produced by a first advertiser of a plurality of advertisers participating in the ad network.

Example 38

This example includes any or all of the elements of any one of examples 30 to 37, further including establishing a secure communications channel with the ad network or the third client device, prior to transmitting the second encrypted ad statistics.

Example 39

According to this example there is provided a computer readable storage medium having instructions stored thereon which when executed by a processor result in the following operations for collecting ad statistics with a first client device including an ad publisher and a secure processing environment: receiving a plurality of advertisements within the secure processing environment; within the secure processing environment, computing ad statistics for each advertisement that is delivered to the ad publisher for display on the first client device, wherein each of the ad statistics is correlated to a statistics collection counter; encrypting, within the secure processing environment, the ad statistics using additive homomorphic encryption, thereby producing encrypted ad statistics; incrementing the statistics collection counter such that it has an incremented value; comparing the incremented value to a threshold statistics collection value; transmitting the first encrypted ad statistics to a second client device when the incremented value is less than the threshold statistics collection value; and transmitting the encrypted ad statistics to an ad network when the incremented value is greater than or equal to the threshold statistics collection value.

Example 40

This example includes any or all of the elements of example 39, wherein the secure processing environment is selected from the group consisting of a trusted execution environment (TEE), a memory enclave, or a combination thereof.

Example 41

This example includes any or all of the elements of any one of examples 38 and 39, wherein the computing ad statistics includes: computing a vector for each of the plurality of ads, wherein a value of the vector is indicative of whether a respective one of the plurality of advertisements has been delivered to the ad publisher for display on the first client device; and multiplying each value of the vector with cost information for an advertisement to which the value pertains, so as to obtain a plurality of multiplied vector values, each multiplied vector value corresponding to one of the plurality of advertisements.

Example 42

This example includes any or all of the elements of example 41, wherein encrypting the ad statistics includes encrypting the plurality of multiplied vector values using the additive homomorphic encryption.

Example 43

This example includes any or all of the elements of any one of examples 38 to 42, wherein the instructions when executed by the processor result in the following additional operations including: receiving a first public homomorphic encryption key (first PAHEK) within the secure processing environment; and performing the additive homomorphic encryption at least in part with the first PAHEK.

Example 44

This example includes any or all of the elements of example 43, wherein the instructions when executed by the processor result in the following additional operations including: receiving the first PAHEK from the ad network.

Example 45

This example includes any or all of the elements of any one of examples 43 and 44, wherein the instructions when executed by the processor result in the following additional operations including: sealing the first PAHEK to the secure processing environment.

Example 46

This example includes any or all of the elements of any one of examples 43 to 45, wherein the first PAHEK is associated with advertisements produced by a first advertiser of a plurality of advertisers participating in the ad network.

Example 47

This example includes any or all of the elements of any one of examples 38 to 46, wherein the instructions when executed by the processor result in the following additional operations including: establishing a secure communications channel with the ad network or the second client device, prior to transmitting the encrypted ad statistics.

Example 48

According to this example there is provided a computer readable storage medium having instructions stored thereon which when executed by a processor result in the following operations for collecting ad statistics with a second client device including an ad publisher and a secure processing environment: receiving encrypted first ad statistics and a first incremented statistics counter value from a first client device, wherein the first incremented statistics counter value is less than a threshold statistics counter value; receiving a plurality of ads within the secure processing environment; within the secure processing environment, computing second ad statistics for each advertisement that is delivered to the ad publisher for display on the second client device, wherein each of the second ad statistics is correlated to a statistics collection counter; encrypting, within the secure processing environment, a sum of the encrypted first ad statistics and the second ad statistics using additive homomorphic encryption, so as to produce second encrypted ad statistics; incrementing the first incremented statistics counter value by a value of the second statistics collection counter, so as to produce a second incremented statistics counter value; comparing the second incremented statistics counter value to the threshold statistics collection value; transmitting the second encrypted ad statistics to a third client device when the second incremented statistics counter value is less than the threshold statistics collection value; and transmitting the second encrypted ad statistics to an ad network when the second incremented statistics counter value is greater than or equal to the threshold statistics collection value.

Example 49

This example includes any or all of the elements of example 48, wherein the secure processing environment is selected from the group consisting of a trusted execution environment (TEE), a memory enclave, or a combination thereof.

Example 50

This example includes any or all of the elements of any one of examples 48 and 49, wherein computing the second ad statistics includes: computing a vector for each of the plurality of ads, wherein a value of the vector is indicative of whether a respective one of the plurality of advertisements has been delivered to the ad publisher for display on the second client device; and multiplying each value of the vector with cost information for an advertisement to which the value pertains, so as to obtain a plurality of multiplied vector values, each multiplied vector value corresponding to one of the plurality of advertisements.

Example 51

This example includes any or all of the elements of example 50, wherein encrypting the ad statistics includes encrypting the plurality of multiplied vector values using the additive homomorphic encryption.

Example 52

This example includes any or all of the elements of any one of examples 50 and 51, wherein the instructions when executed by the processor result in the following additional operations including: receiving a first public homomorphic encryption key (first PAHEK) within the secure processing environment; and performing the additive homomorphic encryption at least in part with the first PAHEK.

Example 53

This example includes any or all of the elements of example 52, wherein the instructions when executed by the processor result in the following additional operations including: receiving the first PAHEK from the ad network.

Example 54

This example includes any or all of the elements of any one of examples 52 and 53, wherein the instructions when executed by the processor result in the following additional operations including: sealing the first PAHEK to the secure processing environment.

Example 55

This example includes any or all of the elements of any one of examples 52 to 54, wherein the first PAHEK is associated with advertisements produced by a first advertiser of a plurality of advertisers participating in the ad network.

Example 56

This example includes any or all of the elements of any one of examples 48 to 55, wherein the instructions when executed by the processor result in the following additional operations including: establishing a secure communications channel with the ad network or the third client device, prior to transmitting the second encrypted ad statistics.

Example 57

According to this example there is provided a system for collecting ad statistics from a first client device, including means for performing the method of any one of examples 21 to 29.

Example 58

According to this example there is provided a system for collecting ad statistics from a second client device, including means for performing the method of any one of examples 30 to 38.

Example 59

According to this example there is provided a computer readable storage medium having instructions stored thereon which when executed by a processor of a first client device causes the first client device to execute the method of any one of examples 21 to 29.

Example 60

According to this example there is provided a computer readable storage medium including instructions stored thereon which when executed by a processor of a second client device causes the second client device to execute the method of any one of examples 30 to 38.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for collecting advertising statistics, the system comprising a first client device comprising an ad publisher and a secure processing environment, the secure processing environment comprising a context information management circuitry (CIMC) that is operable to:
compute, within said secure processing environment, ad statistics for each advertisement of a plurality of advertisements that is delivered to said ad publisher for display on said first client device;
collect each of said ad statistics into a statistics collection;
correlate the statistics collection to a statistics collection counter;
encrypt, within said secure processing environment, said of ad statistics using additive homomorphic encryption, so as to produce encrypted ad statistics;
increment said statistics collection counter such that it has an incremented value; and compare the incremented value to a threshold statistics collection value;
wherein if said incremented value is less than said threshold statistics collection value, said CIMC is further operable to:
authenticate a second client device;
upon authenticating the second client device, establish a secure communication link between said first client device and said second client device;
transmit said encrypted ad statistics and said incremented counter value to said second client device via said secure communication link;
compute, within said secure processing environment, ad statistics for each advertisement of a plurality of advertisements that is delivered to said ad publisher for display on said second client device;
collect each of said ad statistics into said statistics collection;
encrypt, within said secure processing environment, said ad statistics using additive homomorphic encryption, so as to produce encrypted ad statistics;
increment said previously incremented statistics collection counter such that it has a further incremented value; and
compare said further incremented value to the threshold statistics collection value; and
if said incremented value is greater than or equal to said threshold statistics collection value, said CIMC is further operable to transmit said encrypted ad statistics to an ad network.

2. The system of claim 1, wherein said secure processing environment is selected from the group consisting of a trusted execution environment (TEE), a memory enclave, or a combination thereof.

3. The system of claim 1, wherein said CIMC is operable to compute said first ad statistics with the following operations comprising:
computing a vector for each of said plurality of ads, wherein a value of said vector is indicative of whether a respective one of said plurality of advertisements has been delivered to said ad publisher for display on said first client device; and
multiplying each value of said vector with cost information for an advertisement to which said value pertains, so as to obtain a plurality of multiplied vector values, each multiplied vector value corresponding to one of said plurality of advertisements.

4. The system of claim 3, wherein said CIMC encrypts said ad statistics by at least encrypting said plurality of multiplied vector values using said additive homomorphic encryption.

5. The system of any claim 1, wherein said CIMC is further operable to receive at least a first public homomorphic encryption key (first PAHEK), and to perform said additive homomorphic encryption at least in part with said first PAHEK.

6. The system of claim 5, wherein said first PAHEK is associated with advertisements produced by a first advertiser of a plurality of advertisers participating in said ad network.

7. The system of claim 1, wherein:
said plurality of advertisements include at least first advertisements from a first advertiser and second advertisements from a second advertiser, wherein said first advertisements are associated with a first public additive homomorphic encryption key (PAHEK) and said second advertisements are associated with a second PAHEK;
said ad statistics comprise first ad statistics for said first advertisements and second ad statistics for said second advertisements; and
said CIMC is further operable to encrypt said first ad statistics with said first PAHEK and said second ad statistics with said second PAHEK, respectively, so as to produce first and second encrypted ad statistics.

8. The system of claim 7, wherein said first and second ad statistics are associated with first and second statistics collection counters, respectively; and said CIMC is further operable to:
increment said first and second statistics collection counters such that they have a first incremented value and a second incremented value respectively; and
compare the first and second incremented values to respective first and second threshold statistics collection values;
wherein if:
said first incremented value is less than said first threshold statistics collection value, said CIMC is further operable to transmit said first encrypted ad statistics to said second client device;
said first incremented value is greater than or equal to said first threshold statistics collection value, said CIMC is further operable to transmit said first encrypted ad statistics to said ad network;
said second incremented value is less than said second threshold statistics collection value, said CIMC is further operable to transmit said first encrypted ad statistics to said second client device; and
said second incremented value is greater than or equal to said second threshold statistics collection value, said CIMC is further operable to transmit said first encrypted ad statistics to said ad network.

9. A method for collecting ad statistics with a first client device comprising an ad publisher and a secure processing environment, comprising:
receiving a plurality of advertisements within said secure processing environment;
within said secure processing environment, computing ad statistics for each advertisement that is delivered to said ad publisher for display on said first client device;
collecting each of said ad statistics into a statistics collection;
correlating the statistics collection to a statistics collection counter;
encrypting, within said secure processing environment, said ad statistics using additive homomorphic encryption, thereby producing encrypted ad statistics;
incrementing said statistics collection counter such that it has an incremented value;
comparing the incremented value to a threshold statistics collection value;
when said incremented value is determined to be less than said threshold statistics collection value:
authenticating a second client device;
upon authenticating the second client device, establishing a secure communication link between said first client device and said second client device;
transmitting said first encrypted ad statistics and said incremented counter value to said second client device via said secure communication link;
computing within said secure processing environment, ad statistics for each advertisement of a plurality of advertisements that is delivered to said ad publisher for display on said second client device;

collecting each of said ad statistics into said statistics collection;

encrypting, within said secure processing environment, said ad statistics using additive homomorphic encryption, so as to produce encrypted ad statistics;

incrementing said previously incremented statistics collection counter such that it has a further incremented value; and comparing said further incremented value to the threshold statistics collection value; and transmitting said encrypted ad statistics to an ad network when said incremented value is greater than or equal to said threshold statistics collection value.

10. The method of claim 9, wherein said secure processing environment is selected from the group consisting of a trusted execution environment (TEE), a memory enclave, or a combination thereof.

11. The method of claim 9, wherein computing said ad statistics comprises:

computing a vector for each of said plurality of ads, wherein a value of said vector is indicative of whether a respective one of said plurality of advertisements has been delivered to said ad publisher for display on said first client device; and multiplying each value of said vector with cost information for an advertisement to which said value pertains, so as to obtain a plurality of multiplied vector values, each multiplied vector value corresponding to one of said plurality of advertisements.

12. The method of claim 11, wherein encrypting said ad statistics comprises encrypting said plurality of multiplied vector values using said additive homomorphic encryption.

13. The method of claim 9, further comprising:

receiving a first public homomorphic encryption key (first PAHEK) within said secure processing environment; and performing said additive homomorphic encryption at least in part with said first PAHEK.

14. The method of claim 13, wherein said first PAHEK is received from said ad network.

15. The method of claim 13, wherein said first PAHEK is associated with advertisements produced by a first advertiser of a plurality of advertisers participating in said ad network.

16. The method of claim 9, further comprising establishing a secure communications channel with said ad network or said second client device, prior to transmitting said encrypted ad statistics.

17. A computer readable storage medium having instructions stored thereon which when executed by a processor result in the following operations for collecting ad statistics with a first client device comprising an ad publisher and a secure processing environment:

receiving a plurality of advertisements within said secure processing environment;

within said secure processing environment, computing ad statistics for each advertisement that is delivered to said ad publisher for display on said first client device;

collecting each of said ad statistics into a statistics collection;

correlating the statistics collection to a statistics collection counter;

encrypting, within said secure processing environment, said ad statistics using additive homomorphic encryption, thereby producing encrypted ad statistics;

incrementing said statistics collection counter such that it has an incremented value;

comparing the incremented value to a threshold statistics collection value;

when said incremented value is determined to be less than said threshold statistics collection value:

authenticating a second client device;

upon authenticating the second client device, establishing a secure communication link between said first client device and said second client device;

transmitting said first encrypted ad statistics and said incremented counter value to said second client device via said secure communication link;

computing within said secure processing environment, ad statistics for each advertisement of a plurality of advertisements that is delivered to said ad publisher for display on said second client device;

collecting each of said ad statistics into said statistics collection;

encrypting, within said secure processing environment, said ad statistics using additive homomorphic encryption, so as to produce encrypted ad statistics;

incrementing said previously incremented statistics collection counter such that it has a further incremented value; and comparing said further incremented value to the threshold statistics collection value; and transmitting said encrypted ad statistics to an ad network when said incremented value is greater than or equal to said threshold statistics collection value.

18. The computer readable storage medium of claim 17, wherein said secure processing environment is selected from the group consisting of a trusted execution environment (TEE), a memory enclave, or a combination thereof.

19. The computer readable storage medium of claim 17, wherein said computing ad statistics comprises:

computing a vector for each of said plurality of ads, wherein a value of said vector is indicative of whether a respective one of said plurality of advertisements has been delivered to said ad publisher for display on said first client device; and multiplying each value of said vector with cost information for an advertisement to which said value pertains, so as to obtain a plurality of multiplied vector values, each multiplied vector value corresponding to one of said plurality of advertisements.

20. The computer readable storage medium of claim 19, wherein encrypting said ad statistics comprises encrypting said plurality of multiplied vector values using said additive homomorphic encryption.

21. The computer readable storage medium of claim 17, wherein said instructions when executed by said processor result in the following additional operations comprising:

receiving a first public homomorphic encryption key (first PAHEK) within said secure processing environment; and performing said additive homomorphic encryption at least in part with said first PAHEK.

22. The computer readable medium of claim 21, wherein said instructions when executed by said processor result in the following additional operations comprising:

receiving said first PAHEK from said ad network.

23. The computer readable medium of claim 21, wherein said first PAHEK is associated with advertisements produced by a first advertiser of a plurality of advertisers participating in said ad network.

24. The computer readable medium of claim 17, wherein said instructions when executed by said processor result in the following additional operations comprising:

establishing a secure communications channel with said ad network or said second client device, prior to transmitting said encrypted ad statistics.

* * * * *